United States Patent [19]

Buike

[11] 4,291,583

[45] Sep. 29, 1981

[54] DRAG FLOW METER

[75] Inventor: James W. Buike, West Bloomfield, Mich.

[73] Assignee: The Bendix Corporation, Southfield, Mich.

[21] Appl. No.: 80,862

[22] Filed: Oct. 1, 1979

[51] Int. Cl.³ .............................................. G01F 1/28
[52] U.S. Cl. ................................................ 73/861.75
[58] Field of Search ......... 73/DIG. 1, 861.74, 861.75, 73/861.76, 517 AV, 505

[56] References Cited

U.S. PATENT DOCUMENTS

| | | | |
|---|---|---|---|
| 2,546,158 | 3/1951 | Johnson | 73/505 |
| 2,778,905 | 1/1957 | Statham | 73/861.74 |
| 3,067,615 | 12/1962 | Holmes | 73/DIG. 1 |
| 3,114,261 | 12/1963 | Dillon et al. | 73/861.71 |
| 3,238,773 | 3/1966 | Leigh, Jr. | 73/861.74 |
| 3,530,714 | 9/1970 | Akeley | 73/861.75 |
| 4,118,977 | 10/1978 | Olsen et al. | 73/DIG. 1 |

FOREIGN PATENT DOCUMENTS 195794  3/1907  Fed. Rep. of Germany ... 73/861.75

Primary Examiner—Herbert Goldstein
Attorney, Agent, or Firm—Russel C. Wells; John R. Benefiel

[57] ABSTRACT

A drag-type flow meter is disclosed of the type having a drag plate disposed in the fluid flow stream, the velocity of which is to be measured. The drag plate is mounted on a cantilevered arm which is pivitally mounted externally of the fluid flow passage, with a tensioned wire counteracting the drag force tending to pivot the arm. The tensioned wire is disposed in a magentic field and an electrical current is passed through the wire to cause vibration of the wire, the frequency of which varies linearly with the drag force exerted on the drag plate due to the corresponding change in wire tension. Varying frequency of the current provides a digital electrical signal which varies linearly with fluid flow velocity. Embodiments are described enclosing the wire mounting components in a vacuum housing in order to minimize the air damping of the wire vibration, and a mounting arrangement minimizing the effects of temperature variation on the output signal.

2 Claims, 7 Drawing Figures

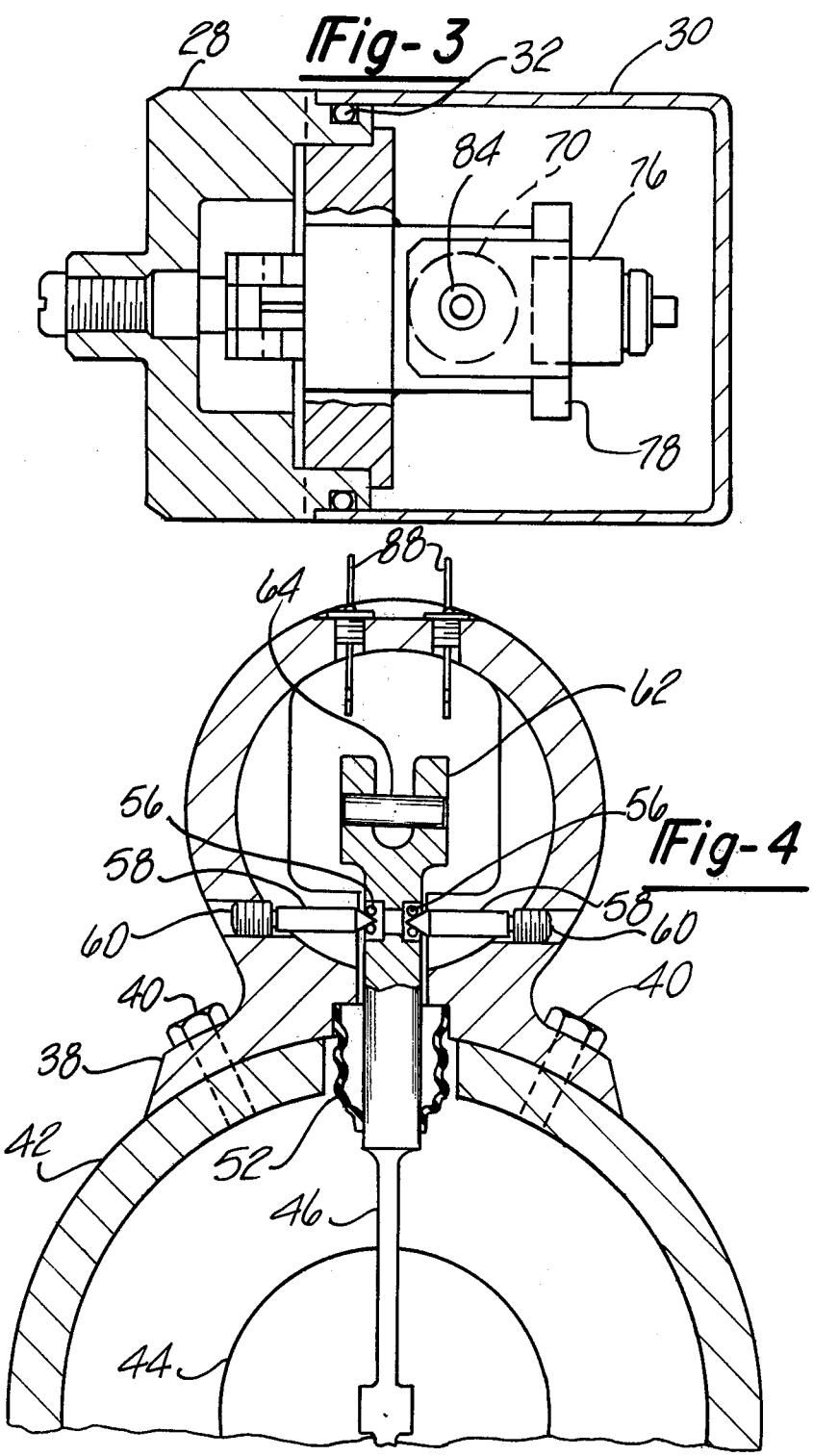

4,291,583

DRAG FLOW METER

BACKGROUND DISCUSSION

This invention concerns fluid flow meters of the type used to measure various flow parameters as fluid flow velocity and mass rate of flow.

It has long been known to measure fluid flow velocity in a flow stream by disposing a drag body or target in the flow stream and measuring the drag force exerted on the body by the fluid flow by various arrangements. The drag force varies with the velocity of flow and thus provides a measure of the average fluid flow velocity in the stream.

This approach, while simple, has the disadvantage of yielding an analog output signal which varies nonlinearly with fluid flow. That is, the drag force varies with the square of the velocity of fluid flow. Also, the analog form of the output signals is relatively inconvenient for handling in digital signal processing circuitry.

It has also been known in the prior art to utilize flow meters which have included means for causing oscillation or turbulence of the fluid in a conduit, the frequency of which is proportional to the fluid velocity. The oscillations are measured by various arrangements, the frequency of which are related back to the flow velocity. This, of course, produces a relatively large pressure loss due to the requirement for substantial turbulent flow about the body.

A typical such arrangement is disclosed in Jannsen et al U.S. Pat. No. 3,863,501.

It is accordingly the object of the present invention to provide a simple drag force measuring flow meter in which the output signal is in digital form and in which there is established a linear relationship between the output signal and the flow rate.

SUMMARY OF THE INVENTION

This and other objects of the present invention, which will become apparent upon a reading of the following specification and claims, are achieved by an arrangement wherein the drag body is mounted on a pivoted arm, in turn drivingly connected to a tensioned, electrically conductive wire, the tension of which is varied to a degree by the drag force. The tensioned wire is disposed in a magnetic field and an electrical current caused to flow through the wire to produce a vibration of the wire by the force generated by the magnetic field, which varies with the degree of drag exerted on the wire force by the varying of the tension of the wire.

The relationship between the tensioning of the wire and the effect on the frequency of vibration is such that the output signal, i.e., the varying frequency of vibration of the conductor wire, is related linearly to the fluid flow rate over the drag body. The output signal being in the form of a frequency signal is easily digitized to thus achieve the above-recited object of the invention.

The wire is preferably disposed within a housing which is sealed so as to enable evacuation thereof and to thus minimize the effects of air dampening on the vibration of the wire. Various mounting arrangements for the wire are disclosed in which the change in tensioning of the wire due to temperature induced vibrations in the effective length of the mounting arm is minimized.

DESCRIPTION OF THE DRAWINGS

FIG. 3 is a top view of the flow meter arrangement shown in FIG. 2.

FIG. 4 is an endwise view of the flow meter depicted in FIGS. 2 and 3.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be construed inasmuch as the invention is capable of taking many forms and variations within the scope of the appended claims.

As developed above, the concept according to the present invention utilizes a tensioned wire arrangement in conjunction with the drag body or target, which tensioned wire is caused to vibrate at a frequency which varies with the drag force.

The relationship between the frequency of vibration and the wire tension varies according to the square root of the tension, and by suitable connection of the drag target with the wire, a linearized output signal is obtained in relation to the fluid flow velocity. This occurs since this latter relationship offsets the drag force increase as a function of the square of fluid velocity.

Figure 1:
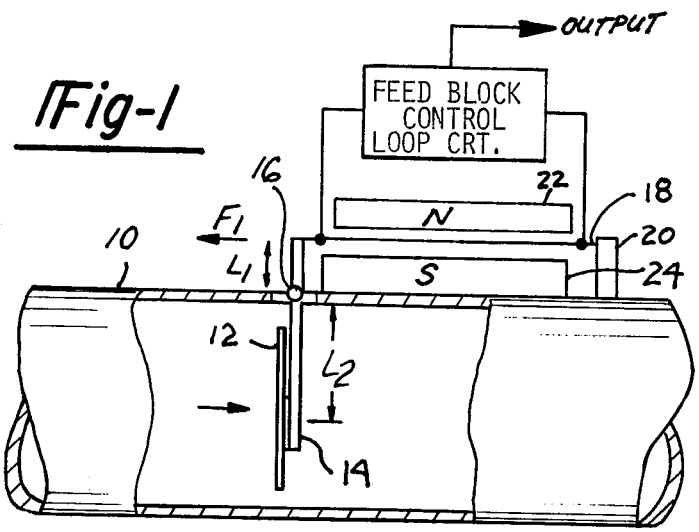
FIG. 1 is a diagrammatic representation of the drag flow meter according to the present invention.

Such an arrangement is depicted diagrammatically in FIG. 1 mounted to a flow passage 10 through which the fluid flow rate is to be determined, and includes a drag body 12 disposed so as to be impinged by the fluid flow and a resultant drag force generated. The drag body 12 is mounted on an arm 14 mounted for pivotal movement about a pivot axis 16. The effective length of the arm section to which the drag body 12 is attached is defined as length L2, while the shorter arm section is defined at length L1. The arm L1 is connected to a tensioned conductive wire 18 which is fixed to a pedestal 20 such that as the drag force increases and decreases, the tension of the tensioned wire 18 varies accordingly.

The tensioned wire 18 is disposed within a magnetic field established as by permanent magnets 22 and 24 which have poles positioned opposite each other as indicated. The presence of the magnetic field induces a transverse force to be generated acting on the tensioned wire 18 in a manner causing the tensioned wire to be vibrated by the passage of an electrical current therethrough. The magnetic field also generates an output signal consisting of the varying electrical voltage which is induced as the tensioned wire 18 vibrates within the magnetic field.

An output signal and current generating circuit is advantageously provided by a conventional feedback control loop circuit, indicated in block diagram form in FIG. 1. Since suitable such circuits are very well known in the art, the details of the same are not included here, but typically include an amplifier connected so as to maintain a current in the tensioned wire 18 by feedback of the induced current to the amplifier, and at the same time generating an amplified output signal.

The linear relationship between the variation in frequencies of the output signal, drag force and fluid flow velocity may be better understood by the following analysis:

The frequency of vibration of a stretched wire is given by the relationship:

$$f = \frac{n}{2L} \sqrt{\frac{F_1}{A_w d}} \quad (1)$$

n = mode (1,2,3, ... )
L = wire length
$F_1$ = wire tension
$A_w$ = wire area
d = density of wire The drag force on the target is given by the relationship:

$$F_d = C_D \rho A V^2 \quad (2)$$

$C_D$ = drag coefficient (constant for disc)
$\rho$ = fluid density
A = target area
V = average velocity of flow Note that the drag force is related to the tension by the expression:

$$F_1 = \frac{L^2 F_d}{L_1} = \frac{L_2 C_D \rho A V^2}{L_1}$$

The equation (1) becomes:

$$f = \frac{n}{2L} \sqrt{\frac{L_2 C_D \rho A V^2}{L_1 A_w d}} \quad (4)$$

or:
$$f = KV \quad (5)$$

K = constant which shows that frequency is linear with velocity. The important point to recognize is that the frequency is related to the square root of the tension (Eq. 1). Then, the tension is proportion to the square of the velocity (Eq. 2). The result is Eq. 4 where the frequency is related to the first power of the velocity.

Figure 2:
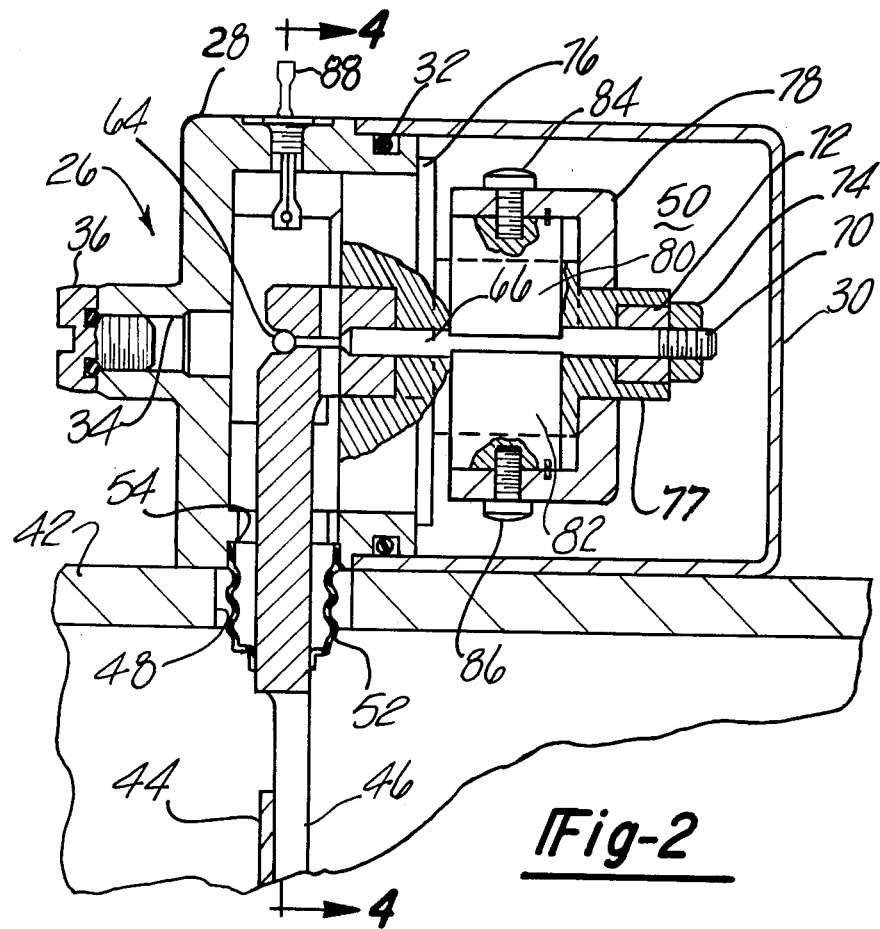
FIG. 2 is a transverse sectional view of an actual embodiment of a transducer of the flow meter according to the present invention shown installed in a flow conduit.

The tensioned wire 18 has a force exerted thereon by the passage of a current therethrough in the presence of the magnetic field which will tend to vibrate at the natural frequency which is a function of the wire tension. FIGS. 2, 3 and 4 depict an actual implementation of the concept of a flow meter depicted diagrammatically in FIG. 1.

The tensioned wire 18 is preferably vibrated in a vacuum since the presence of the surrounding atmosphere tends to produce an undesirable damping of the wire vibration which will disturb the calibration of the meter. Accordingly, the flow meter 26 depicted in FIG. 2 is provided with a housing 28 and mating cover 30 which is secured over the housing 28 with a seal 32 provided such that a vacuum may be established within the interior of the housing 28 through an evacuation port 34, closed off after evacuation by a sealing screw 36.

The housing 28 is provided with a pedestal 38 which is secured by means of threaded fasteners 40 to the fluid flow conduit 42.

A drag flow body 44 is disposed within the interior of the fluid flow conduit 42 and is mounted on a force arm 46 which extends through an opening 48 formed in the fluid flow conduit 42.

In order to maintain the vacuum with the interior 50, the housing cover assembly includes a sealing bellows 52 preferably of thin flexible metal which is sealed to the exterior of the force arm 46 and to the interior of the bore 54 formed in the housing 28.

The force arm 46 is pivotally mounted by a pair of bearings 56 carried by the force arm 46 and engaged by tapered pivot pins 58 carried by the openings formed in the housing 28 and retained by means of threaded lugs 60.

The force arm 46 is overhung about the pivot point and has a bifurcated section 62, which carries an end fitting 64 secured to a length of electrically conductive wire. A high tensile strength material such as tungsten is preferred since the wire 66 is pretensioned to relatively high stress levels.

At the opposite end of wire 66 is an end fitting 70 which is received within an insulated bushing 72 of an electrically insulating material such as boron nitride. A tensioning adjustment nut 74 threadedly engages the end fitting 70 and presets the tension level of the wire 66.

A support block 76 is also received within the interior bore of the housing 28 having a projecting boss portion 77 upon which is mounted a ferromagnetic yoke 78, which is keyed over the boss portion 77. The boss portion 77 supports the insulated bushing 72. The ferrmagnetic yoke 78 serves to provide a mounting for a pair of opposite pole oriented magnets 80 and 82 which are disposed at the ends with the wire 66 passing between the ends. Each of the magnets 80 and 82 is supported on an arm opposite the ferromagnetic yoke 78, and threaded fasteners 84 and 86 allow adjustment of the intermediate gap.

Thus, the wire 66 is disposed in a magnetic field such that an electrical current will generate a force acting on the wire tending to establish a transversely directed vibration of the wire 66, the frequency of which is a function of the tension of the wire, which in turn corresponds to the force acting on the drag flow body 44 by the fluid flow.

As developed above, the drag force being a function of the square of the velocity of the fluid flow, and the vibration frequency being a function of the square root of the wire tension, there is essentially a linear relationship between the fluid flow velocity and the frequency of vibration of the wire 66.

In order to minimize the effects of temperature shifts, the housing 28 and force arm 46 are preferably constructed of metal exhibiting coefficients of expansion closely matched to that of the wire, such as molybdenum.

In order to make the necessary electrical connection to the feedback control loop circuitry, feed through connectors 88 are employed which are in turn adapted to be connected to short electrical leads (not shown) extending from either end of the wire 66.

The drag flow meter device according to the present concept is applicable to pipe flow monitoring applications and may also be applied to ducted flow meter applications such as for oceanographic and limnological studies, or for a vane oriented wind velocity sensor.

Figure 5:
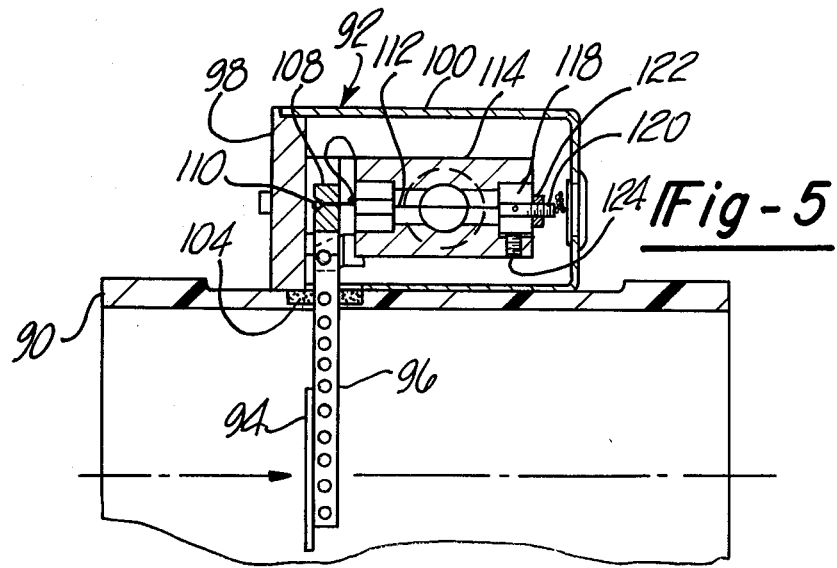
FIG. 5 is a transverse sectional view of an alternate embodiment of the transducer of the drag flow meter according to the present invention.
Figure 6:
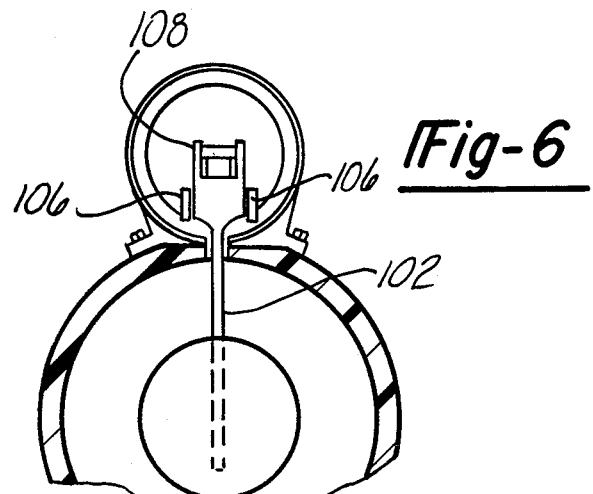
FIG. 6 is an endwise view of the transducer shown in FIG. 5.
Figure 7:
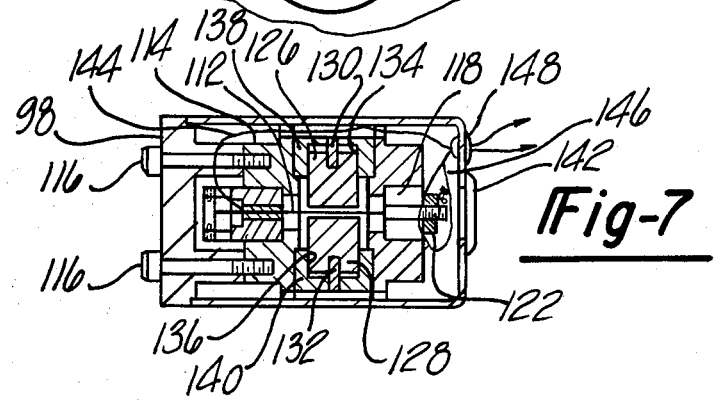
FIG. 7 is a top view of the flow meter shown in FIGS. 5 and 6.

In this case, as indicated in the embodiment depicted in FIGS. 5 through 7, a duct 90 is provided to which is mounted a flow meter 92 according to the present invention.

In similar fashion, a drag disc plate 94 is provided secured to a force arm 96. Various sizes of drag discs may be provided to afford many different flow rate ranges and differing fluid densities.

A two-part enclosure defined by an endcap 98 and cover 100 are provided which enables a vacuum to be maintained within the interior for the purposes described above. In this case, a soft foam annular sealing disc 104 is provided in order to maintain the vacuum throughout the slight excursion of force arm 96.

The force arm 96 is pivotally supported at a point intermediate its length between a pair of clevises 106 with an upper bifurcated end section 108 supporting a wire fitting 110 to which is secured a length of tungsten wire 112.

Support body 114 is secured to the endcap 98 by a pair of cap screws 116 and serves to mount the opposite end of the support body 114, which holds an insulating bushing 118. Insulating bushing 118 receives the opposite end of the wire 112 with an end fitting 120 secured to the opposite end, being threadably engaged with a tension adjusting nut 122. Insulating bushing 118 is locked in position by means of a set screw 124.

The support body 114 also serves to mount a pair of opposed cylindrical permanent magnets 126 and 128 having oppositely directed polarities which are juxtaposed with a gap therebetween so as to establish a magnetic field through which the wire 112 passes.

The mounting of the magnets 126 and 128 is by means of threaded elements 130 and 132 which control the position of the magnets in respective bores 134 and 136 formed in plug bushings 138 and 140, respectively.

An access plug 142 is provided to enable the tension adjusting nut 122 to be reached through the end of the cover 100.

Electrical leads 144 and 146 are secured to either end of the wire 112 and are passed out through a sealing grommet 148.

Accordingly, it can be appreciated that the object of the present invention has been achieved by the disclosed drag flow meters, which produce an electrical output signal which is easily digitized by the use of counters and is thus compatible with digital signal processing circuits. The offsetting relationship between the variation in frequency with tension and the increasing drag force with fluid flow velocity produces an essentially linear relationship between fluid flow and the output signal constituted by the varying frequency electrical signal.

The arrangement itself is relatively simple and rugged and, accordingly, is compatible with many fluid flow measuring applications.

While the fluid flow meter described provides a measurement of average flow velocity, the same may also be employed for the measurement of mass rate of flow, inasmuch as the drag force provides a measurement of the fluid density as well as the average velocity of flow.

The embodiments of the invention in which an exclusive property or privilege is claimed are defined as follows:

1. A fluid flow meter for generating a linearly varying output signal having a linear variation with respect to the flow of the fluid, said meter comprising:

a conduit having a passage through which a fluid flows;

drag body means having an arm extending through the wall of said conduit and pivotally connected thereto, a drag body connected at one end of said arm and positioned transverse to the direction of the flow of the fluid, said arm pivoting in response to the flow of the fluid against said drag body;

a vibrating wire sensor having a tension wire operatively connected to the other end of said arm and responsive to the pivotal motion of said arm for varying both the longitudinal tension in said wire and the frequency of vibration of said wire;

said wire and said drag body means being fabricated from materials having matching coefficients of expansion; and electrical signal generating means responsive to the frequency of vibration of said wire sensor and operable for generating an electrical signal varying linearly with respect to the flow of fluid against said drag body.

2. The fluid flow meter according to claim 1 further including means enclosing said vibrating wire sensor in a vacuum for minimizing the damping effects of the atmospheric air pressure on said vibration of said wire and means for sealing said arm in said enclosing means throughout the range of pivotable motion of said arm.

* * * * *